Figures 1, 2:
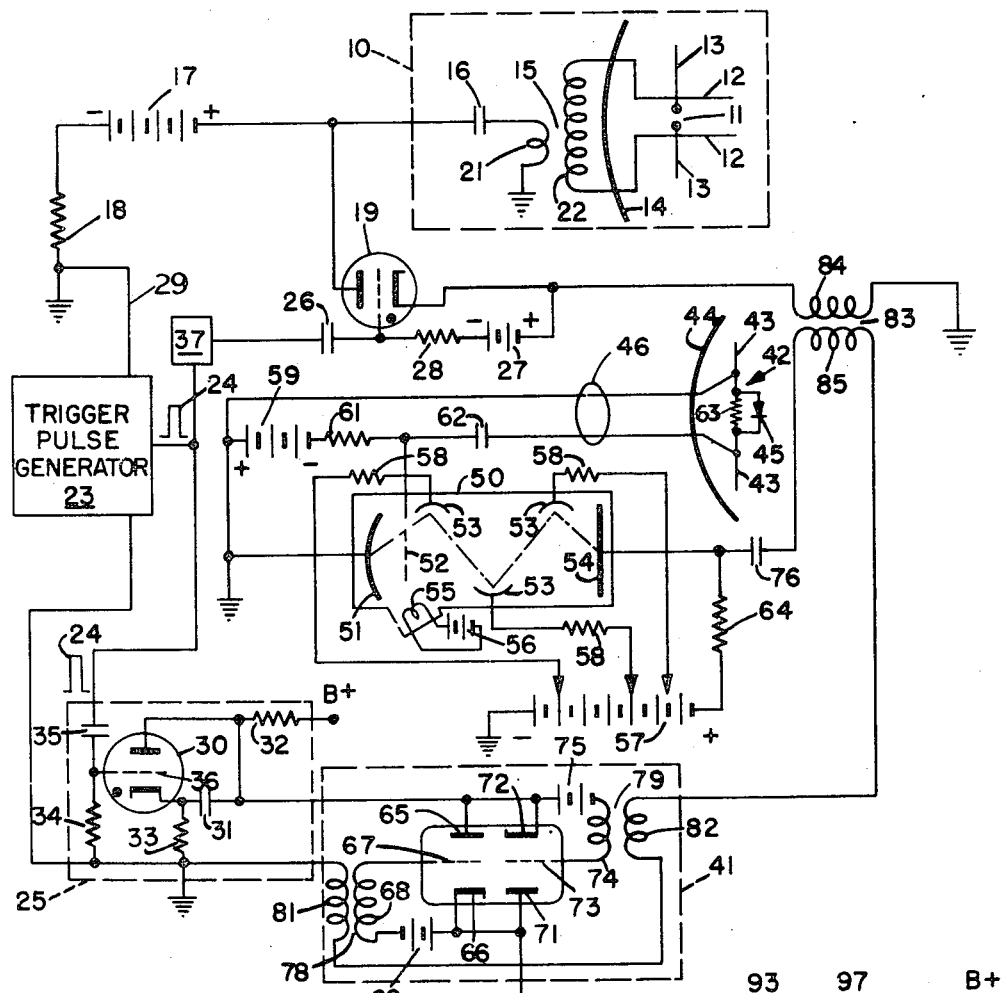

Feb. 7, 1950　　　E. E. TURNER, JR　　　2,496,900
DISTANCE MEASURING SYSTEM
Filed Nov. 29, 1947

TO SAW-TOOTH GENERATOR

TO VACUUM TUBE VOLTMETER

INVENTOR.
EDWIN E. TURNER JR.
BY
HIS ATTORNEY

Patented Feb. 7, 1950

2,496,900

UNITED STATES PATENT OFFICE 2,496,900

DISTANCE MEASURING SYSTEM

Edwin E. Turner, Jr., West Roxbury, Mass., assignor to Raytheon Manufacturing Company, a corporation of Delaware Application November 29, 1947, Serial No. 788,811

6 Claims. (Cl. 343—13)

The present invention relates generally to radio echo detecting and ranging systems, and more particularly to a system having very high ranging accuracy and very low minimum range. The invention is particularly suited for use in altimeter and collision warning systems in aircraft.

An absolute radio altimeter which will constantly indicate with a high degree of accuracy the height above ground, even to low values of the order of ten feet, of a fast-moving aircraft at all times and with the utmost simplicity has been sought after for some time. Such a system requires the employment of extremely short transmitted pulses, and consequently the band width of the receiver system must be extremely great. While radio echo altimeter systems have heretofore been devised, they have usually been lacking in high ranging accuracy and low minimum range, and have been heavy and complex in structure. The present invention provides a system which possesses low minimum range with high ranging accuracy, and may be made light in weight and relatively simple in construction, and which provides the desired range information as an indication on a conventional direct-reading galvanometer type meter which may be located where desired. As additional features, the meter may be adjusted to read range or height accurately from within the system, providing a reliable and simple performance check.

The invention envisions the employment of a very simple spark-type transmitter which provides exceedingly short pulses of electromagnetic radiation, of the order of 0.01 microsecond. These pulses are generated and radiated through a single unitary instrumentality. There is provided also an equally simple receiving, detecting, and amplifying system employing a separate antenna which incorporates a detector within itself, and as an amplifier only one electron tube of the electron multiplier type. The receiver system is not tuned and hence is responsive to an exceptionally wide band of frequencies. In addition it requires little or no servicing. Range information is constantly provided on a meter through a "memory" device which operates at low voltages and is actuated only to record changes in the condition being observed. The memory device is arranged to perform accurately, and is not adversely affected by the indicating device connected thereto.

The invention is described below in connection with the drawing, which shows schematically in Fig. 1 an apparatus that may be used as an absolute altimeter or as a collision warning device, and in Fig. 2 a modification to provide for calibration of the meter.

In the system shown in Fig. 1, pulsed electromagnetic radiation is generated and propagated into space by a pulse generator-transmitter 10, shown generally in a dotted-line box. Pulse generator-transmitters suitable for the purposes of the present invention are shown in various forms in Patents No. 2,407,245; 2,408,405; 2,408,406; and 2,417,052. The pulse generator-transmitter 10 shown in Fig. 1 is generally like Fig. 2 of Patent No. 2,417,052, and will not be further described except to identify its principal parts, which are a spark gap 11, capacitor members 12 thereto connected, dipole radiators 13, a reflector 14, and a high tension step-up transformer 15. A storage capacitor 16 provides the energy for spark discharges. A battery 17 provides current for charging the capacitor 16, the charging path being completed through a protective resistor 18 to ground, and the primary winding 21 of the transformer 15. A normally non-conductive electronic switch tube 19, which is preferably a gaseous discharge tube, and may desirably be of the hydrogen thyratron type, discharges the capacitor 16 to ground when rendered conductive, to provide a current surge in the primary winding 21 of the transformer 15. This surge provides a high voltage in the secondary winding 22, and a pulse of electromagnetic energy is generated, as described in the above mentioned patents. The resistor 18 prevents short-circuiting of the battery 17 during conductivity of the tube 19.

A trigger pulse generator 23 provides a very short positive voltage pulse 24 which is fed to the switch tube 19 and to a saw-tooth voltage generator 25 in parallel. The positive pulse 24 is applied to the control grid of the switch tube 19 through a coupling capacitor 26. This grid is biased negatively with respect to the cathode by means of a battery 27, which is connected between the grid and the cathode through a current limiting resistor 28. The positive charge stored in the capacitor 26 after a positive pulse 24 has been applied to the grid leaks off through the resistor 28, ground, and the ground connection wire 29 of the pulse generator 23, so that the tube 19 soon again becomes non-conductive in preparation for the next trigger pulse. The discharge path of the storage capacitor 16 is through the tube 19, the primary winding 84 of a transformer 83 (the purpose of which will be explained below), ground, and the primary winding 21 of the pulse transformer 15. The impedance of this path is very low, so that the capacitor 16 discharges very quickly and the tube 19 is therefore quickly extinguished. This arrangement permits the employment of high pulse repetition rates, of the order of 300,000 pulses per second, which are useful in short range systems for altimeter purposes.

The saw-tooth voltage generator 25 is of a conventional form, and comprises an electron tube 30, which may be of the gaseous type, a charging capacitor 31 wherein a substantially linearly increasing voltage is periodically generated, and a charging resistor 32. The charging capacitor 31 and charging resistor 32 are connected in series across a source of unidirectional voltage, B to ground, and the tube 30 is connected at its anode and cathode across the capacitor 31. A resistor 33 is provided in the cathode circuit, through which the charging current flows and biases the cathode positively with respect to ground. The charging capacitor 31 is charged only to a small fraction of the available B voltage at any time, so that the voltage across the capacitor increases substantially linearly with time during each charging operation. The control electrode 36 of the tube 30 is connected to ground through a resistor 34, and to the cathode through the resistors 33 and 34 in series, and is thus biased negatively with respect to the cathode. The bias provided is sufficient to maintain the tube 30 nonconductive for the range of anode-cathode potentials that is used. The positive pulse 24 is applied to the control electrode 36 through a coupling capacitor 35, and renders the tube 30 conductive at about the same time that the generator-transmitter switch tube 19 is fired. The positive voltage that is thus applied to the control electrode 36 leaks off through the grid resistor 34, ground, and the trigger pulse ground wire connection 29 and, due to the low anode-cathode voltage that exists when the charging capacitor 31 is discharged through the tube, the tube 30 is very quickly rendered non-conductive again. Recharging of the capacitor 31 provides the positive cathode (or negative grid) bias through the cathode resistor 33 to maintain the tube non-conductive until the next succeeding trigger pulse 24.

At the termination of the conductive period of the tube 30, the next succeeding linear voltage sweep commences, almost simultaneously with the generation and transmission of a pulse of radio frequency energy by the generator-transmitter 10. The discharge time of the saw-tooth generator capacitor 31 through the tube 30 may introduce some delay in the commencement of the sweep voltage. To avoid this delay and start the sweep voltage exactly when the energy pulse is transmitted, a phase shifter 37 may be interposed between the trigger pulse generator 23 and the switch tube 19 if desired, so that the trigger pulse 24 fed to the switch tube will arrive there a small time after the saw-tooth voltage generator tube 30 is fired.

The saw-tooth voltage generated in the saw-tooth generator capacitor 31 is applied across a measuring capacitor 40 through a normally-open electronic switch 41 and ground. The normally-open switch is controlled by a radio receiver, as will be described below.

The radio receiver system has an antenna 42 which may include as its elements a dipole 43 and a parabolic reflector 44. A unidirectional conductor 45, for example a crystal, is connected directly between the elements of the dipole 43, as a detector, so that pulsed unidirectional current only appears in the antenna connection cable 76 when echoes of the transmitted energy are received in the receiver antenna 42. To protect the crystal 45 from being burned out during the generation and transmission of energy pulses, the generator-transmitter 10 and the receiver antenna 42 may be located at opposite ends of the wing of the aircraft.

Unidirectional current pulses from the receiving antenna 42 are brought to a wide-band amplifier which comprises an electron-multiplier tube 50 having a photoemissive cathode 51, a control electrode 52, a plurality of secondary electron emitters 53, an anode 54, and a light source 55. The light source 55 is energized by a battery 56, and arranged to illuminate the cathode 51, which emits electrons. A battery 57 provides positive potentials for the secondary electron emitters 53 and the anode 54. The negative terminal of the battery 57 and the cathode 51 are grounded, while the positive terminal of the battery is connected to the anode 54 through a plate load resistor 64. Each of the secondary electron emitters 53 is connected to an individual intermediate point on the battery 57 through a current limiting resistor 58. The secondary electron emitters 53 are each made increasingly positive with relation to the cathode 51, the most positive secondary electron emitter being the one furthest from the cathode 51, or nearest to the anode 54. Electrons emitted from the cathode are thus attracted to the secondary emitter 53 nearest to the cathode, where by impact they cause the emission of an increased number of secondary electrons. The secondary electrons are further attracted to the next furthest removed secondary emitter, where the process is repeated, until the electron stream that arrives at the anode 54 is vastly multiplied in density by comparison with the electron stream emitted by the cathode.

The particular electron multiplier tube employed may have a photoemissive cathode and a light source, as shown and described herein or, if desired, a thermionic cathode may be employed. Either kind of cathode can furnish electrons by random emission. However, the thermionic cathode requires heat and consequently eventually causes contamination of the secondary emitter surfaces. In the practical constructions of photoemissive electron multipliers that are available, the light source is either enclosed, or the light is brought to the cathode by a devious path by way of a mirror, so that no contamination of the secondary emitter surfaces occurs. Due to these advantageous characteristics, the photoemissive electron multiplier provides a very highly satisfactory wide band amplifier, having a high signal-to-noise ratio.

The flow of electrons from the cathode 51 is controlled by a control grid 52, interposed between the cathode and the nearest secondary emitter 53. The control grid 52 is normally biased negatively with respect to the cathode 51 by means of a battery 59 connected between the cathode and the control grid through a resistor 61. The electron stream is thus held to a certain low, steady-state value, or, if desired, cut off altogether. The unidirectional signals from the antenna 42 are applied across the grid resistor 61 through a capacitor 62 in such a fashion as to drive the control grid 52 in a positive direction with relation to the cathode 51. A resistor 63 of high value is connected across the unidirectional conductor 45, and the charge thus given to the control grid 52 leaks off through this resistor, through a circuit including the bias battery 59 and the grid resistor 61. The time constant of this circuit is preferably chosen to be very short. The grid control is effective where the electron density is low, and thereafter amplification takes places as a characteristic of the tube 50 itself. The electron stream thus increases in density when an echo pulse is received in the antenna 42, and the resultant current flow in the plate load resistor 64 causes a voltage drop at the anode 54 which is employed to close the normally open switch 41 to place a charge on the measuring capacitor 40 in a manner that will now be described.

The normally open switch 41 comprises a pair of triode sets, the first set comprising a first anode 65, first cathode 66, and first control electrode 67, and the second set comprising a second anode 71, second cathode 72, and second control electrode 73. The first anode 65 and the second cathode 72 are connected together and to the output of the saw-tooth generator 25. The first cathode 66 and second anode 71 are connected together and to one side of the measuring capacitor 40. The other side of the measuring capacitor is grounded. The first control electrode 67 is connected to the first cathode 66 through the secondary winding 68 of a first pulse transformer 78 and a first bias battery 69 in series. The second control electrode 73 is connected to the second cathode 72 through the secondary winding 74 of a second pulse transformer 79 and a second bias battery 75 in series. The bias batteries 69 and 75 normally bias the triode sets in which they are connected to cut off, thus keeping the switch 41 normally open.

The voltage drop at the electron multiplier anode 54 is the receiver output signal, in the form of a unidirectional output pulse, and is connected through a coupling capacitor 76 to the primary windings 81 and 82 of the first and second pulse transformers 78 and 79 in series. The connection is such that, when there is a receiver output signal, both control electrodes 67 and 73 are driven sufficiently positive with relation to their respective cathodes 66 and 72 to overcome the bias furnished by the batteries 69 and 75 respectively. The transformer 83 is employed as a lock-out pulse transformer and has its primary winding 84 connected in series in the anode-cathode circuit of the generator-transformer switch tube 19, and its secondary winding 85 connected in series in the signal transmitting circuit to the normally open switch 41. The signal transmitting circuit thus includes, in all, in series connection, the coupling capacitor 76, the secondary winding 85 of the lock-out transformer, the primary windings 81 and 82 of the two pulse transformers, ground, the amplifier battery 57, and the output resistor 64 in which the output signal appears. Any charge remaining on the coupling capacitor 76 after the transmission of a pulse therethrough is dissipated through the signal transmitting circuit. The time constant of this circuit is preferably very short.

The output pulse thus furnished to the normally open switch 41 overcomes the negative bias of each triode section. The triode sections are reversely connected in parallel in the circuit to the measuring capacitor 40, so that one or the other triode section conducts current depending on which of the two capacitors 31 and 40 has the higher potential at the time when the output pulse is impressed on the switch 41. Thus, if the saw-tooth generator capacitor 31 is at that instant charged more positively th uring capacitor 40, the first anode cathode 66 become conductive; o tooth generator capacitor 31 is at charged only to a value that is neg spect to the potential of the n pacitor 40, the second anode 71 and ode 72 become conductive. In eith measuring capacitor 40 is momenta to the saw-tooth generator capacit sumes the same charge, or more same potential level above ground. of the switch 41 is momentary onl pulse transformers unblock their re trol electrodes only when there is a age change in the plate load resis sudden change is insensitive to th the pulse that follows. The lock-ou former is connected in the signal circuit in a fashion to oppose the two signal pulse transformers 81 a effective to prevent unblocking o electrodes 67 and 73 during the ge transmission of an energy pulse. rent that may be drawn by the con 67 and 73 is confined to the respect cathode circuit, and does not effect the measuring capacitor 40. Such if it does occur, may be minimized sion of grid circuit resistors (not s respective grid-cathode connection.

The potential that is present at ar measuring capacitor 40 is indicated tube voltmeter circuit comprising tubes 91 and 92. The first tube 91 at its anode 93 directly to a source tional voltage B, which is preferal lated, and at its cathode 94 to gr a cathode resistor 95. The contro is connected to the switch side of t capacitor 40. The second tube 92 at its anode 97 to the B supply, and 98 to ground through a second ca 99. A potential divider 101 is con ly from B to ground, and the seconc electrode 102 is connected to the po through a variable tap 103. A met may be a sensitive galvanometer, a resistor 105 are connected in series two cathodes 94 and 98.

The first tube 91 of the vacuum t is operated as a cathode follower, substantially infinite impedance, draws grid current. The cathode lows the grid potential very accura charge on the measuring capacitor sipated through the tube. The s operated as a voltage divider, and the adjustable tap 103, adjusts th the second tube cathode 98 to be that of the first tube cathode 94 w] 104 is expected to read "zero." T tap 103 is thus a "minimum" re ment. The variable resistor 105 amount of meter deflection per vol! adjusts the meter to read a desirec value. These two adjustments a calibration adjustments of the sy; will be shown, can be made within In the system of the invention de the measuring capacitor 40 fui "memory" device with respect to distance to a single target that is l ously observed, for example the e a moving aircraft. Since the resi ie saw-tooth generator, or
id the measuring capacitor
y a few signals need be re-
r to charge the measuring
potential level as the sweep
r if the range, or in this
creasing, each received sig-
ı render the switch 41 con-
rst anode 65 and first cath-
oltage increases with time.
the altitude is decreasing,
ınd second cathode 72 will
during each observation
ring capacitor 40 will then
tively than the sweep ca-
 no change in the altitude
ceived echoes, neither tri-
ch 41 will become conduc-
control electrodes 67 and
y disposed to permit con-
 anodes and cathodes will
otential, and no electrons
ır triode section. As men-
rrent should occur, it is lo-
ive grid-cathode circuits,
 charge on the measuring
acuum tube voltmeter has
ut impedance, the "mem-
ıg capacitor 40 is very
itor holds its charge for a
sence of signals that alter
on of the system. Altera-
he measuring capacitor is
ı, so that there is no delay
ges in terrain contour, or
orizontally directed meas-
as mentioned above, the
ıg capacitor 40 has little
sudden changes in range
.ccurate. The meter 104
ıde directly.
gth is known in terms of
:he sweep is synchronized
ılse, the meter 104 can be
system by means of the
Fig. 2. To the measuring
e added two single-pole
111 and 112. The first
ıum," or zero range, ad-
ally this switch connects
ctrode 73 to the second
Fig. 1, but for calibration
onnected directly to the
second triode section is
ve over the whole sweep
 generator 25, and the
assumes the lowest sweep
e vacuum tube voltmeter,
ıent tap 103 is then ad-
 difference between the
s zero, and the meter 104
 switch 111 is now re-
osition, and the second
o the calibrate position.
ıking the first triode sec-
the first anode 65 and
ın entire sweep voltage
ıg capacitor 40 assumes
e available. In the vac-
"maximum" adjustment
ljusted until the meter
e to which the full sweep
he second switch 112 is
mal position to connect
le 67 to its cathode 66 and restore normal operation of the measuring capacitor switch 41.

Many modifications of the above described embodiment may be made within the scope of the invention to accommodate a particular employment thereof. For example, the meter 104 may be replaced by any one of many forms of threshold alarms known to the art, and the invention can then serve to light a lamp or sound a bell when the altitude of the aircraft becomes dangerously low or a collision becomes imminent. In certain of its aspects, for example the system for controlling the measuring capacitor switch 41 for the measuring capacitor 40, the invention may find employment in other types of echo ranging equipment.

Having now described my invention, I claim:

1. In a system for distance measurement by the time of travel method, in combination: a spark-gap transmitter for generating and propagating a pulse of oscillatory energy; and a receiving circuit including a dipole antenna having a unidirectional conductor connected across the output thereof and an electron-multiplier type amplifier connected to said output.

2. In a system for distance measurement by the time of travel method, in combination: a spark-gap transmitter for generating and propagating a pulse of oscillatory energy; and a receiving circuit including a dipole antenna having a unidirectional conductor connected across the output thereof and an electron-multiplier type amplifier with a photoemissive cathode and a source of illumination therefor connected to said output.

3. In a system for distance measurement by the time of travel method, in combination: a spark-gap transmitter for generating and propagating a pulse of oscillatory energy; a receiving circuit including a dipole antenna having a unidirectional conductor connected across the output thereof and an electron-multiplier type amplifier connected to said output; means for generating a timing wave; a substantially isolated charge storage device; means responsive to the output of said amplifier for momentarily applying said timing wave to said storage device in response to the receipt of an echo; and means for indicating the charge stored in said storage device.

4. In a system for distance measurement by the time of travel method, in combination: a spark-gap transmitter for generating and propagating a pulse of oscillatory energy; a receiving circuit including a dipole antenna having a unidirectional conductor connected across the output thereof and an electron-multiplier type amplifier connected to said output; a timing capacitor; means to charge said capacitor to a voltage that varies in accordance with the time elapsed after transmission of said pulse; a substantially isolated charge storage capacitor; a normally open switch connected between the two capacitors and operatively connected to the output of said amplifier for momentary closure upon the receipt of an echo; and means for indicating the charge stored in said storage capacitor.

5. In a system for distance measurement by the time of travel method, in combination: a spark-gap transmitter for generating and propagating a pulse of oscillatory energy; a receiving circuit including a dipole antenna having a unidirectional conductor connected across the output thereof and an electron-multiplier type amplifier connected to said output; means for generating a timing wave; a substantially isolated charge storage device; means responsive to the output of said amplifier for momentarily applying said timing wave to said storage device in response to the receipt of an echo; and a vacuum tube voltmeter having substantially infinite input impedance for indicating the charge stored in said storage device.

6. In a system for distance measurement by the time of travel method, in combination; a spark-gap transmitter for generating and propagating a pulse of oscillatory energy; a receiving circuit including a dipole antenna having a unidirectional conductor connected across the output thereof and an electron-multiplier type amplifier connected to said output; means for generating a timing wave; a substantially isolated charge storage device; means for applying said timing wave to said storage device including a pair of reversely disposed, parallel connected triode sections connected between the timing wave generating means and the storage device, the grid of each triode being biased to a cut-off potential by a bias circuit connected between the grid and cathode; an inductive connection between the output of said amplifier and said grids arranged to overcome the bias of both triodes in response to the receipt of an echo; and means for indicating the charge stored in said storage device.

EDWIN E. TURNER, JR.

REFERENCES CITED

The following references are of record in the file of this patent:

UNITED STATES PATENTS

| Number | Name | Date |
|---|---|---|
| 1,958,971 | Lux | May 15, 1934 |
| 2,152,321 | McIlvaine | Mar. 28, 1939 |
| 2,324,314 | Michel | July 13, 1943 |
| 2,404,527 | Potapenko | July 23, 1946 |
| 2,423,024 | Hershberger | June 24, 1947 |
| 2,426,454 | Johnson | Aug. 26, 1947 |

FOREIGN PATENTS

| Number | Country | Date |
|---|---|---|
| 469,417 | Great Britain | July 26, 1937 |